United States Patent [19]

Furuhashi et al.

[11] Patent Number: 4,875,208

[45] Date of Patent: Oct. 17, 1989

[54] TRANSMISSION METHOD FOR CONTROL INFORMATION IN COMMUNICATION NETWORK

[75] Inventors: Koshi Furuhashi, Yamato; Satoshi Miyazaki, Sagamihara; Masakazu Furuya, Kawasaki; Tatsuo Kawatobi, Yokohama; Sinichi Kouyama, Hiratsuka; Jiro Kashio, Kawasaki, all of Japan

[73] Assignee: Hitachi, Ltd., Tokyo, Japan

[21] Appl. No.: 148,532

[22] Filed: Jan. 26, 1988

[30] Foreign Application Priority Data

Mar. 6, 1987 [JP] Japan .................................. 62-50029

[51] Int. Cl.$^4$ ............................................. H04J 3/24
[52] U.S. Cl. ..................................... 370/94.1; 370/60
[58] Field of Search ....................... 370/94, 60, 13, 16, 370/54; 340/825.06, 825.16, 825.52

[56] References Cited

U.S. PATENT DOCUMENTS

| | | | |
|---|---|---|---|
| 4,433,411 | 2/1984 | Gefroerer et al. | 370/94 |
| 4,507,777 | 3/1985 | Tucker et al. | 370/16 |
| 4,745,593 | 5/1988 | Stewart | 370/60 |

Primary Examiner—Douglas W. Olms
Assistant Examiner—Min Jung
Attorney, Agent, or Firm—Pennie & Edmonds

[57] ABSTRACT

Herein disclosed is a communication network, in which two terminal nodes transmit and receive messages containing a destination node discriminator and a source node discriminator by way of a communication route composed of at least one relay node and a plurality of information links connecting the terminal nodes and the relay node. In this communication network, the relay node is stored in advance, in accordance with the combination of a destination node and a source node, with both the information link for transmitting the messages received and the flag information indicating the establishment of the communication route from said source node to the relay node itself. When any of the terminal nodes designates the other terminal node as the destination node and transmits the control message for the communication route establishment to the destination node, the relay node having received the control message sets the flag information, which corresponds to the combination of the source node and the destination node, in a state indicating the link establishment, and transmits said received message to said information link in case the information link corresponding to said combination is in the connected state. The relay node on the communication route transmits the control message to an adjacent node, when it detects the state change of the adjacent information link, under a condition that the flag information corresponding to said information link is in the set state.

7 Claims, 6 Drawing Sheets

| DESTINATION NODE (21) | OUTPUT INFORMATION LINK (22) | ROUTE ESTABLISHMENT FLAG (23) |
|---|---|---|
| 3 | 5 | |
| 4 | 5 | |

20-1

| 1 | 6 | |
|---|---|---|

20-3

| 1 | 7 | |
|---|---|---|

20-4

| DESTINATION NODE (31) | SOURCE NODE (32) | OUTPUT INFORMATION LINK (33) | ROUTE ESTABLISHMENT FLAG (34) | |
|---|---|---|---|---|
| 3 | 1 | 6 | | F13 |
| 4 | 1 | 7 | | F14 |
| 1 | 3 | 5 | | F31 |
| 1 | 4 | 5 | | F41 |

30

| LINK (41) | LINK FLAG (42) | |
|---|---|---|
| 5 | | L5 |
| 6 | | L6 |
| 7 | | L7 |

40

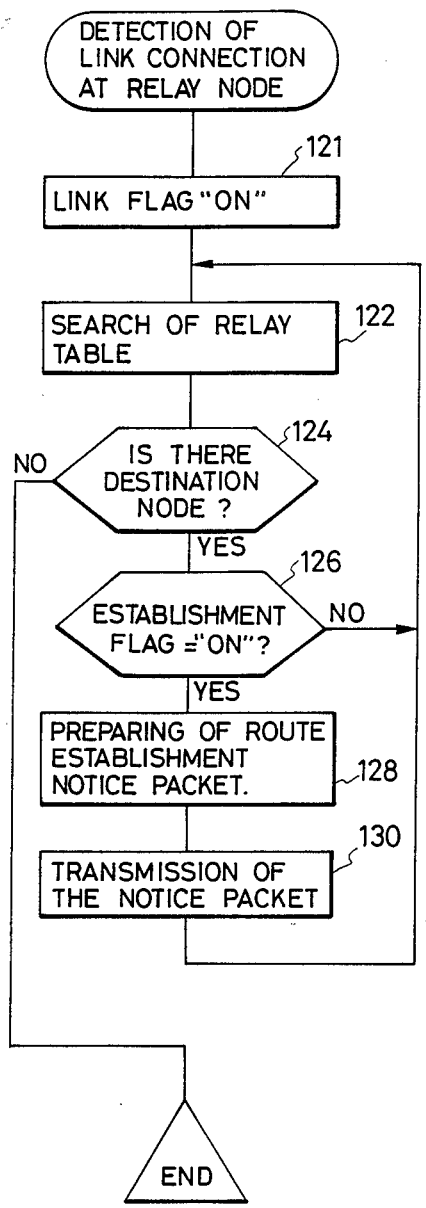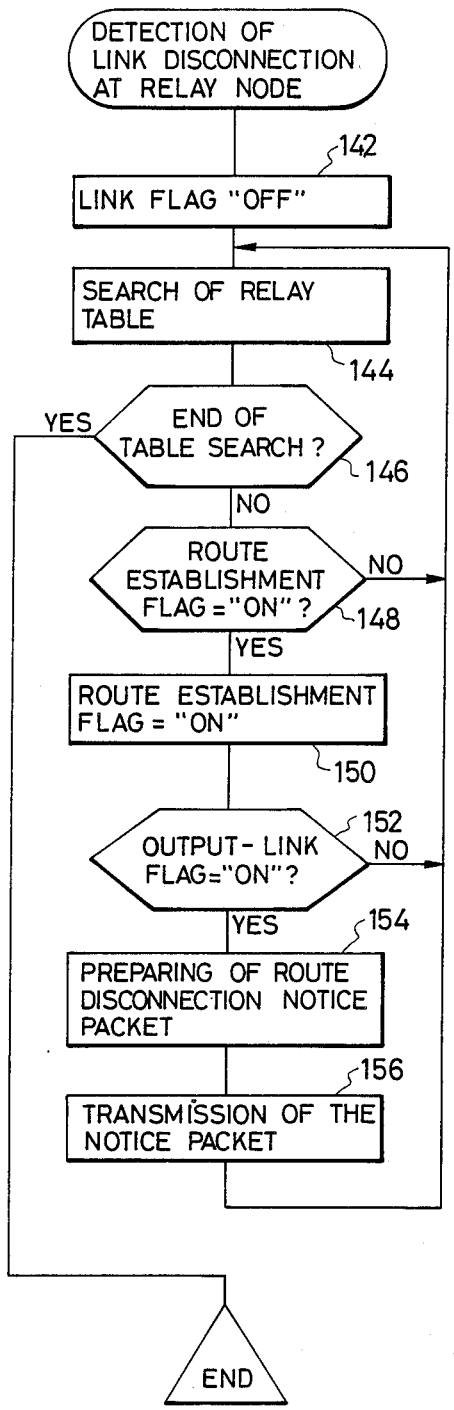

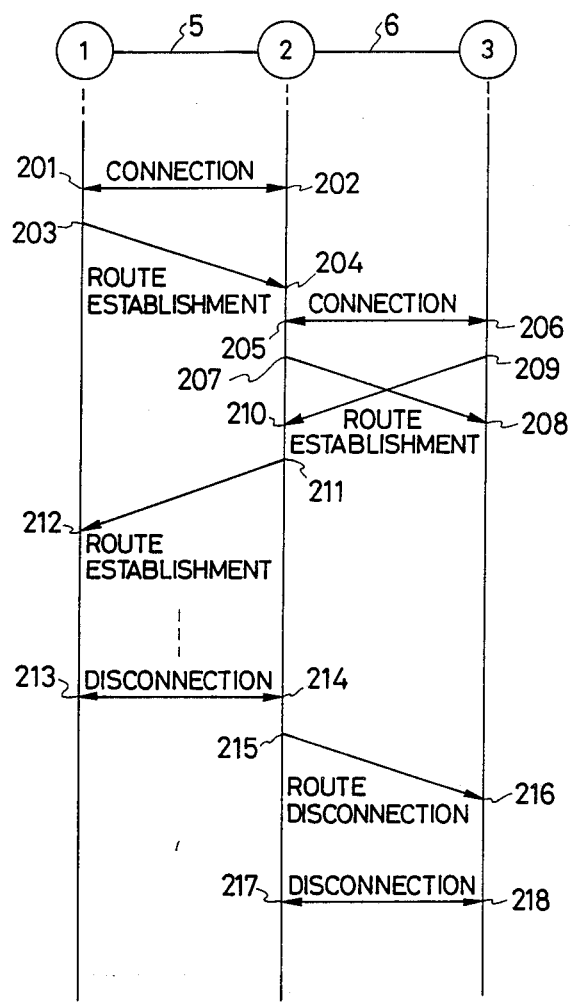

TRANSMISSION METHOD FOR CONTROL INFORMATION IN COMMUNICATION NETWORK

BACKGROUND OF THE INVENTION

(1) Field of the Invention

The present invention relates to a transmission system for control information in a communication network and, more particularly, to a control information transmission method suited for a communication network having a plurality of nodes interposed in one information transmission route and a transmission system therefor.

(2) Description of the Prior Art

The communication network in which at least one relay node is interposed between a node acting as an information source station and a node acting as a destination station is required to have a technique by which each node is enabled to grasp the state of a connection link or an adjacent node. In the communication network of this kind according to the prior art, according to Japanese Patent Laid-Open No. 52143/1985, each node (or a packet exchanger) is enabled to notify periodically an adjacent node of its own state so that it can detect the state of the adjacent one on the basis of the periodicity of the notice of the state.

In the communication network of the prior art, sufficient consideration is not always taken from quantitative reduction of the control information such as the aforementioned state notice packet to be transmitted between the nodes.

For example, let the communication network be assumed, in which two nodes $N_1$ and $N_5$ are connected by a communication route R which is composed of relay nodes $N_2$, $N_3$ and $N_4$ and information links $l_1$ to $l_4$ as shown in FIG. 14. It is also assumed that all the information links be connected and that a communication route be established between the nodes $N_1$ and $N_5$. If, in these states, the information link $l_1$ is troubled, the node $N_2$ detects the trouble and generates a fault notice packet. The terminal node $N_5$ is informed, when it receives the packet, of the fact that the communication route R to the node $N_1$ has been disconnected so that it cannot communicate with the node $N_1$. If, at this time, another information link such as the link $l_3$ is troubled, the node $N_4$ also performs operations similar to the aforementioned ones to transmit a fault notice packet. However, this additional packet is useless for the node $N_5$ which has already be informed of the fault of the route R, and this means that waste control information for the communication network has been transmitted.

SUMMARY OF THE INVENTION

An object of the present invention is to provide control information transmission method and system for a communication network which can suppress transmission of the aforementioned ineffective control information.

Another object of the present invention is to provide control information transmission method and system suitable for a communication network in which two nodes communicate with each other through an information transmission route containing at least one relay node.

Still another object of the present invention is to provide control information transmission method and system which are suitable for a packet exchange network and in which the using efficiency of network resources is improved.

In order to achieve the above-specified objects, according to the present invention, there is provided a method of transmitting control information in a communication network having a plurality of nodes connected to one another through information links, comprising: a first step at which a node for message source sends out a control message containing a destination node discriminator and a source node discriminator for establishing a communication route with a node for message destination to one information link determined in accordance with said communication route; a second step at which a relay node on said communication node having received said control message sets route flag means prepared in a manner to correspond to the communication route defined by the source node and destination node of said control message, at a first state indicating that the route from said source node to said relay node has been established, and sends out said control message received to an information link determined in accordance with said communication route; a third step at which said relay node sets said route flag means, when it receives from an information link at the side of said source node a control message indicating the disconnection of said communication route, at a second state indicating that the communication route from said source node to said relay node has been disconnected, and sends out said control message to an information link determined by the destination node of said control message; and a fourth step at which said relay node refers, when it detects that the state of the information link connected to said relay node has changed, to said route flag means corresponding to the communication route composed partially of said information link, and judges, in accordance with the state of said route flag means, whether or not the control message for informing an adjacent node of the change of said communication route status is to be transmitted.

In the present invention, each relay node interposed between two terminal nodes of one communication route, in case a message (or packet) is to be transmitted from one terminal node to the other or vice versa, stores flag information indicating the establishment of the communication route between a source node and itself in a manner to correspond to the combination between a destination node and the source node to be indicated in said message. The relay node sends control information for informing another node of the disconnection or connection of the information link on condition that the aforementioned flag information is in the set state, when the state of the information link connected to itself forming the aforementioned communication route, for example, from the disconnected state to the connection state or vice versa.

Assuming that the present invention be applied to the aforementioned communication network of FIG. 14, for example, all the route establishment flags between the individual relay nodes $N_2$, $N_3$ and $N_4$ and the node $N_1$ and between the same and the node $N_5$ are in the set states while the communication route keeps established between the nodes $N_1$ and $N_5$. Here, if the information link $l_1$ is troubled, this trouble is detected by the relay node $N_2$. Since, at this instant, the establishment flag of the route from the node $N_1$ to the node $N_5$, which is stored by the relay node $N_2$, is in the set state, the relay node $N_2$ sends out control information telling the link trouble (i.e., the disconnection) to the link $l_2$. This control information is sequentially relayed by adjacent nodes so that the nodes $N_3$ to $N_5$ are informed of the fact that the routes between themselves and the terminal node $N_1$ have been disconnected, and reset the route establishment flag information corresponding to the route from the node $N_1$ to the node $N_5$. The route establishment flag from the node $N_1$ to the node $N_5$, which is stored by the node $N_2$, is also reset. In case another information link, e.g., the link $l_3$ is thereafter troubled, the relay node $N_4$ having detected the trouble does not inform the node $N_5$ of link trouble because the route establishment flag of the route including the link $l_3$ is reset. This results in no waste transmission of the control information on the communication network. Incidentally, at the instant the information link $l_3$ is troubled, the flag information of the route from the node $N_5$ to the node $N_1$, which is stored by the relay nodes $N_2$, $N_3$ and $N_4$, is in the set state. As a result, the control information is transmitted from the node $N_3$ to the node $N_2$, when the node $N_3$ detects the aforementioned trouble of the link $l_3$, so that the route establishment flag corresponding to that route is reset. Even if the link $l_3$ is restored, from trouble on the other hand, the node $N_5$ is not informed of link restoration (i.e., connection) unless the link $l_1$ is restored.

The foregoing and other objects, advantages, manners of operation and novel features of the present invention will be understood from the following detailed description when read in connection with the accompanying drawings.

DESCRIPTION OF THE DRAWINGS

FIG. 7 to 11 are flow charts illustrating control operations each for realizing a control information transmission system according to the present invention;

FIG. 12 is a diagram for describing the operations of one embodiment of the control information transmission system according to the present invention;

FIG. 13 is a diagram for describing the state change of the route establishment flags of a relay node in the embodiment of FIG. 12.

DESCRIPTION OF THE PREFERRED EMBODIMENTS

Figure 1:
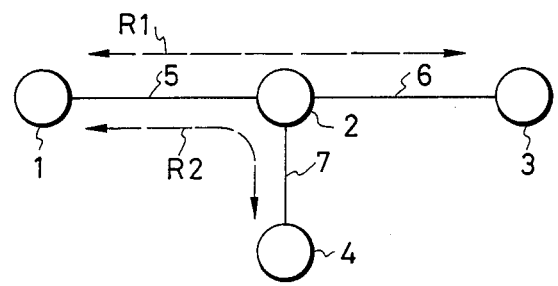
FIG. 1 is a diagram schematically showing one example of the communication network to which is applied the present invention.

FIG. 1 shows one example of the communication network to which is applied the present invention. In this network, four nodes 1, 2, 3 and 4 are connected to one another through information links 5, 6 and 7 to establish routes $R_1$ and $R_2$ between the nodes 1 and 3 and between the nodes 1 and 4, respectively. For convenience of description, only one relay node 2 is included in each of the aforementioned individual routes $R_1$ and $R_2$ in this example. Despite of this fact, however, the present invention is effective especially for the communication network containing a plurality of relay nodes on one route. A plurality of routes may be defined commonly in a pair of nodes. Hereinafter, the nodes located at the terminal ends of each route, i.e., the two nodes for information source and destination stations will be defined as "terminal nodes" in the present specification. Incidentally, the two terminal nodes on a certain route and a relay node interposed between the two terminal nodes each may be relay nodes or a terminal node on another route. Although not shown, moreover, each node on the communication network is connected with a not-shown information processor or terminal device.

Figure 2:
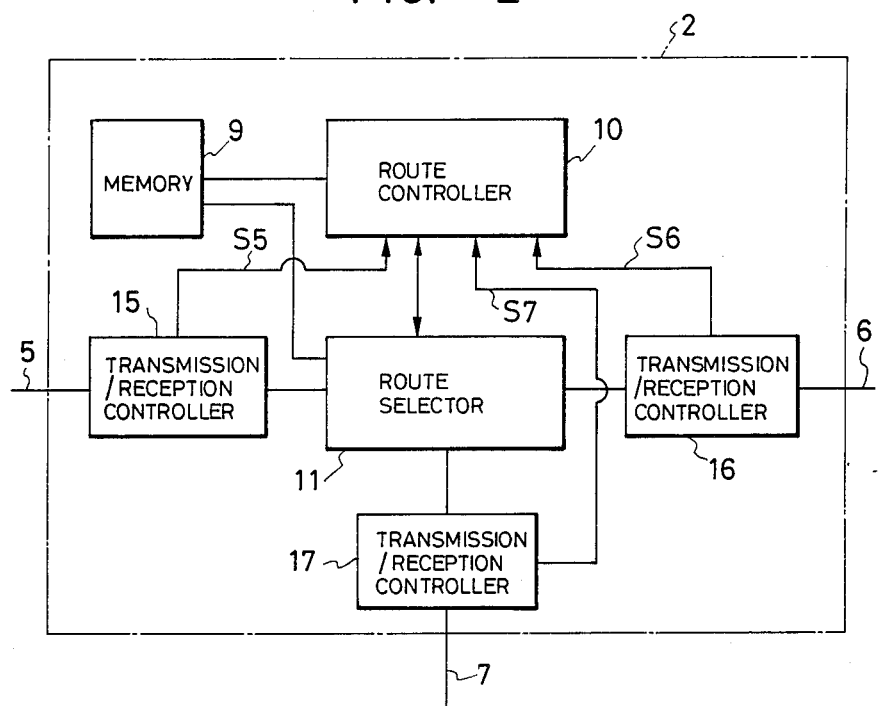
FIG. 2 is a block diagram showing the structure of a node.

FIG. 2 is a diagram showing the structure of the node 2. Reference numeral 10 designates a route controller for controlling the state of a route with reference to a later-described table prepared in a memory 9. The route controller 10 is constructed of a data processor which is operated on a later-described program. Numerals 15, 16 and 17 designate transmission/reception controllers acting as interfaces, which are disposed to correspond to the information links 5, 6 and 7, respectively. Numeral 11 designates a route selector for selecting the destination of a message (or packet) which is fed from the aforementioned route controller or transmission/reception controller. The transmission/reception controllers 15, 16 and 17 have functions to monitor the states of the information links 5, 6 and 7, respectively, to feed the route controller 10 with signals $S_5$, $S_6$ and $S_7$ indicating whether the information links are in the connected or disconnected states. The packet received from each information link is fed through the transmission/reception controller 15, 16 or 17 to the route selector 11. As a result, this route selector 11 transmits the received packet to the route controller 10 in case the packet belongs to a control packet, and to the transmission/reception control of the information link corresponding to the destination node designated in the packet in case the packet belongs to other communications ones.

The remaining nodes 1, 3 and 4 basically have structures similar to that of FIG. 2, and the information processor or terminal device acting as the source or destination of the packet is connected with any node through one of the transmission/reception controllers.

Figures 3, 4, 5, 6:
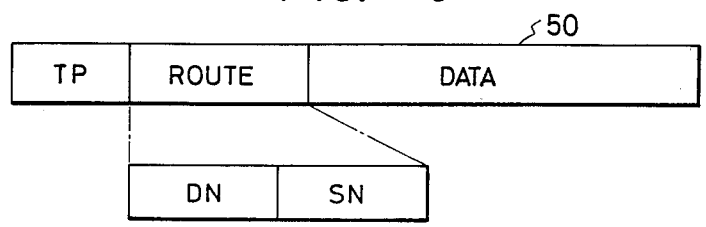
FIG. 3 is a diagram for describing a terminal table which is referred to by terminal nodes 1, 3 and 4.
FIG. 4 is a diagram for describing a relay table which is referred to by a relay node 2.
FIG. 5 is a diagram for describing a link flag table.
FIG. 6 is a format showing a transmission message (or packet)

In order to select the routes of the transmission packets, according to the present invention, the terminal nodes 1, 3 and 4 are equipped with terminal node tables 20, as indicated by 20-1, 20-3 and 20-4, respectively, in FIG. 3. Each terminal node table for each route terminated at one hand by itself, stores a data set which is composed of a destination node or another terminal node name 21, an output information link name 22 and a flag 23 indicating a route established situation. In case the relay node 2 is a message source node or destination node (or terminal node), it is equipped, too, with a terminal node table similar to the table 20 of FIG. 3.

The relay table 30 stores a data set which is composed of a destination node name 31, a source node name 32, an output information link name 33 and a route establishment flag 34. The relay table 30 contains two data sets of go and return paths for each route, and the route establishment flag 34 indicates whether or not the route from the terminal node of the source station to the relay node under consideration is established. For example, a route establishment flag F13 of FIG. 4 is turned "on", if the section from the node 1 to the relay node 2 of the route $R_1$ defined between the nodes 1 and 3 is communicable, but "off" if the same section is uncommunicable. Likewise, a route establishment flag F31 indicates whether or not the section of the route $R_1$ between the node 3 and the relay node 2 is communicable.

In the present invention, moreover, each node is equipped with a table 40 indicating the connected state of the information link connected with that node. This table 40 is composed, in the case of the node 2, for example, of an information link name 41 (5, 6 or 7) and a link flag 42 indicating the connected state of each of the aforementioned information links with an adjacent node, as shown in FIG. 5.

FIG. 6 shows a fundamental format of a packet (or message) 50 to be transmitted or received between the aforementioned individual nodes. The packet 50 is composed of a field TP indicating the kind of the packet, a field ROUTE indicating a transmission route (or path), and an additional information field DATA. The field ROUTE in turn is composed of a destination node discriminator DN and a source node discriminator SN.

For example, in case a packet is to be transmitted from the node 1 to the node 4 while the route $R_2$ keeps established between the nodes 1 and 4, the route selector 11 of the node 1 receives the packet through the transmission/reception controller from the terminal device and transmits the packet 50, which has the discriminator of the node 4 in the field DN and the discriminator of the node 1 in the field SN, to the information link 5 with reference to the terminal node table 20-1.

The relay node 2 having received that packet retrieve the relay table 30 by using the content of the field ROUTE as a retrieval key and transmits the packet to the link 7 which is stored in the column of the output information link. The node 4 having received that packet from the information link 7 processes the destination node SN (i.e., outputs the node SN to the information processor or terminal device connected thereto) because it coincides with the destination node SN.

Next, the information transmission controls for establishing and disconnecting the routes in accordance with the present invention will be described in the following with reference to the flow charts of FIGS. 7 to 11. Incidentally, the controls to be illustrated in those flow charts are accomplished by the route controller of each node.

Figure 7:
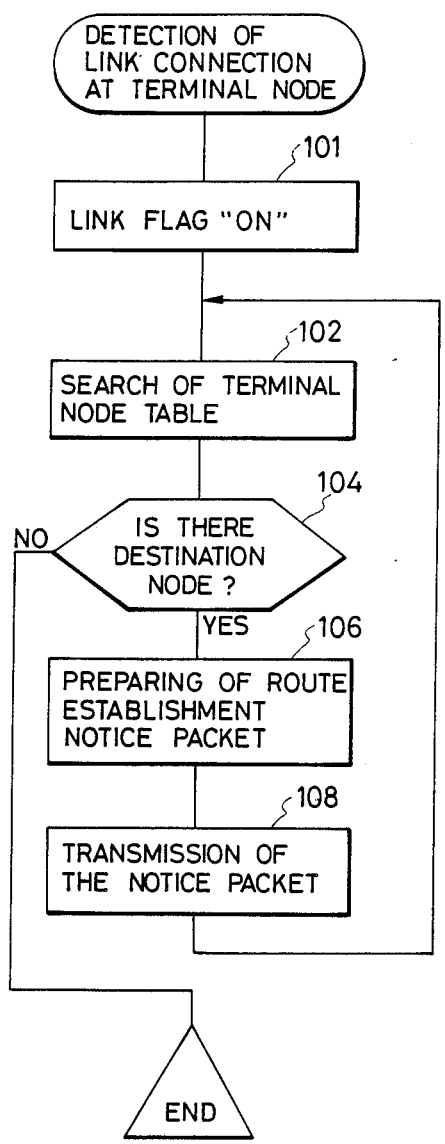

If the transmission/reception controller (15, 16 or 17) detects that the disconnected adjacent information link restores its connected state, the route controller of the terminal node executes the controlling operations illustrated in FIG. 7. First of all, the link flag 42 of the information link under consideration is turned "on" (at a step 101), and the destination node of the route containing that information link is retrieved (at a step 102) with reference to the terminal node table 20. If there is any corresponding destination node (at a step 104), a route establishment notice packet is prepared at a step 106 and is transmitted (at a step 108) to the aforementioned information link. When this flow chart is ended, it is returned to the step 102 to repeat the operation procedures described above. This routine is ended at the instant the transmissions of the route establishment notice packets are completed for all the destination nodes of the aforementioned information link which have been registered in advance in the terminal node table.

Figure 8:
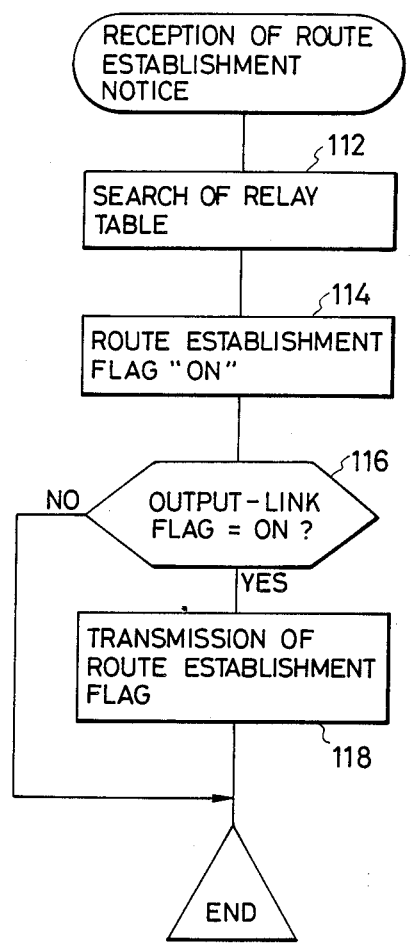

FIG. 8 illustrates the operations of the relay node which has received the route establishment notice packet from other nodes. In the relay node, the content of the ROUTE field in the received packet, i.e., the pair of the destination node and the source node is used as a retrieval key to refer to the relay table 30 (at a step 112), and the corresponding route establishment flag 34 is turned "on" (at a step 114). Next, the link flag 42 corresponding to the output information link 33 in the aforementioned ROUTE is referred to (at a step 116). If this link is transmittable, the aforementioned route establishment notice packet is transmitted to that link (at a step 118).

FIG. 9 illustrates the controlling operations to be executed by the root controller in case the transmission/reception controller at the relay node detects that the adjacent information link having been disconnected restores its connected state. In this case, after the link flag 42 corresponding to the aforementioned information link is turned "on" (at a step 121), the relay table 30 is referred to (at a step 122) by using the information link as a retrieval key, to determine the pair (or ROUTE) of the destination node 31 and the source node 32 using that information link as the output link. Next, the route establishment flag 34 corresponding to the aforementioned ROUTE is referred to (at a step 126). If the route establishment flag 34 is "on", the route establishment notice packet including the aforementioned ROUTE is prepared (at a step 128) and is transmitted to the aforementioned information link (at a step 130). After this the route is returned to the step 122 and is ended when the ROUTEs utilizing the information link are processed up (at a step 124). By this routine, the route establishment notice, which has resided in the node under consideration because the information link keeps disconnected till that time, is transmitted to a subsequent node through the now connected information link so that the route establishment flag propagates to the subsequent node.

FIG. 10 illustrates the action of the route controller at the relay node in case the transmission/reception controller detects that the disconnected adjacent information link restores its connected state. In this case, the link flag 42 of the disconnected information link is turned "off" (at a step 142), and the relay table 30 is referred to at a step 144 to determine the pair (or ROUTE) of the destination node 31 and the source node 32 making use of the aforementioned information link as the output information link. Next, the pair (or inverse ROUTE) of the destination node and the source node in the direction opposite to that ROUTE is prepared and used again as a retrieval key to determine the output information link 33 and the route establishment flag 34 with reference to the relay table. Next, the route establishment flag 34 is checked (at a step 148). If this route establishment flag 34 is "on", it is changed over to an "off" state (at a step 150). By this operation, it is stored that the route at the side of the information link, which is detected to be disconnected, is unusable (or unestablished). Next, the link flag of the output information link corresponding to the aforementioned inverse ROUTE is checked (at a step 152). If this link flag is on, the route disconnection notice packet containing the content of the inverse ROUTE in the ROUTE field is prepared (at a step 154) and transmitted (at a step 156). After this, the routine is returned to the step 144 and is ended when all the ROUTEs using the aforementioned disconnection link as the output information link are processed up (at a step 146). By executing this routine, all the nodes at the side of the normal route utilizing the disconnection-detected information link is notified of the disconnection of the route.

Figure 11:
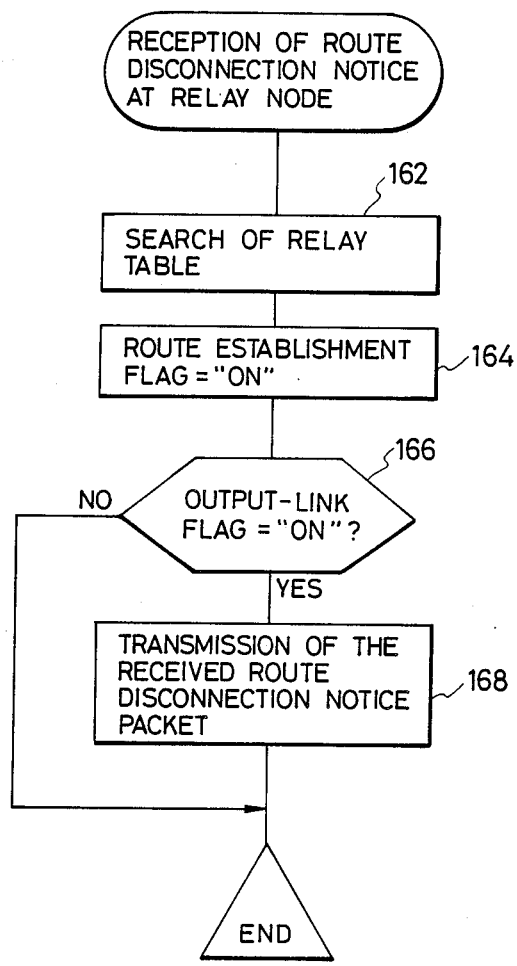
Figure 14:
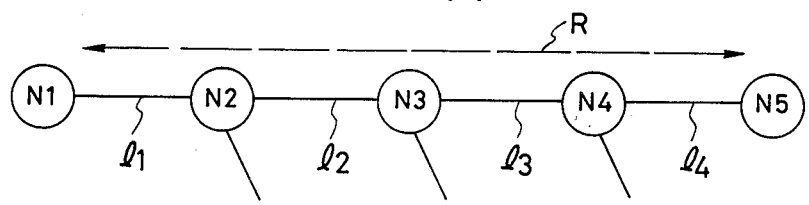
FIG. 14 is a diagram showing the structure of one example of a communication network including a plurality of relay nodes, to which can be applied the present invention.

FIG. 11 illustrates the controlling operations to be executed by the link controller of the relay node having received the route disconnection notice from another node. In this case, the relay table 40 is referred to (at a step 162) by using as a key the content of the ROUTE field contained in the aforementioned notice, and the route establishment flag on the route under consideration is switched "off" (at a step 164). Next, the link flag 42 of the output information link on that route is checked (at a step 166). If this link flag 42 is on, the route disconnection notice packet is transmitted to that link (at a step 168).

FIGS. 12 and 13 illustrate the operations of the nodes 1, 2 and 3 upon the establishment and disconnection of the route based on the aforementioned controls and the state changes of the route establishment flags F13 and F31 at the disconnection node 2, respectively, by taking up the route $R_1$ of FIG. 1 as an example.

In the initial state, both the information links 5 and 6 are disconnected so that both the route establishment flag F13 of the route directed from the node 1 to the node 3 and the route establishment flag F31 in the inverse direction are "off".

When the information link 5 comes first connected, this connection is detected by the nodes 1 and 2 (at steps 201 and 202). The terminal node 1 transmits the route estabishment notice packet (at a step 203) in accordance with the routine of FIG. 7 and is received by the node 2 (at a step 204). At this time, the flag F13 is turned "on" in accordance with the routine of FIG. 8.

Next, when the information link 6 comes connected, this connection is detected by the nodes 2 and 3 (at steps 205 and 206), and the node 2 transmits the notice of the route establishment (at steps 207 to 210) in accordance with the routine of FIG. 7. When the node 2 receives the route establishment notice from the node 3 (at the step 210), the link establishment flag F31 is turned "on". Since, at this instant, the output information link 5 has already been connected, that notice is transmitted to the node 1 (at steps 211 and 212) in accordance with the routine of FIG. 8. Thus, the individual terminal nodes 1 and 3 receive the route establishment notices from the destination nodes, respectively, to communicate with each other by making use of the aforementioned route.

Next, when the information link 5 comes disconnected, this disconnection is detected by the transmission/reception controllers of the nodes 1 and 2 (at steps 213 and 214). In this case, the routine of FIG. 10 is executed by the node 2 so that the link flag L5 of the information link 5 and the link establishment flag F13 are switched "off" to transmit the route disconnection notice packet to the information link 6 (at a step 215). The node 3 receives the aforementioned notice packet (at a step 216) to learn that the route $R_1$ with the node 1 has been disconnected. If, in this state, the information link 6 comes also disconnected, this disconnection is detected by the nodes 2 and 3 (at steps 217 and 218). In this case, the node 2 executes the routine of FIG. 10 to switch the link establishment flag F31 "off" but notifies the node 1 of nothing because the link flag L5 of the output information link 5 has already been off.

According to the present invention, when all the information links between two communication nodes come connected, the route establishment notice is transmitted to the terminal nodes. Even in case any information link is troubled, the terminal nodes are notified of this trouble only at the instant the first trouble after the route establishment is detected. This can suppress any repeated transmission of the control information on the communication network.

What is claimed is:

1. A method for transmitting control information in a communication network having a plurality of nodes comprising:
   a first step of sending out from a message source node a first control message including a destination node discriminator and a source node discriminator for establishing a communication route between a message destination node and the message source node to an information link determined in accordance with said destination node discriminator;
   a second step of operating a relay node on said communication route having received said first control message to set route flag means corresponding to the communication route defined by the source node discriminator and destination node discriminator of said first control message, at a first state which indicates that the route from said source node to said relay node has been established, and to relay said first control message to an information link determined in accordance with said communication route; and
   a third step of operating said relay node when said relay node detects that the condition of the information link connected to said relay node has changed, to send out a second control message for informing an adjacent node of the change in condition of said communication route detected by the relay node if said route flag means corresponding to the communication route composed partially of said information link indicates said first state.

2. A method of transmitting control information in a communication network having a plurality of nodes comprising:
   a first step of sending out from a message source node a first control message including a destination node discriminator and a source node discriminator for establishing a communication route between a message destination node and the message source node to an information link determined in accordance with said destination node discriminator;
   a second step of operating a relay node on said communication route having received said first control message to set route flag means corresponding to the communication route defined by the source node discriminator and destination node discriminator of said first control message, at a first state which indicates that the route from said source node to said relay node has been established, and to relay said first control message to an information link determined in accordance with said communication route; and
   a third step of operating said relay node to change the state of route flag means, when said relay node receives from an information link at the side of the source node a second control message indicating a disconnection of said communication route, to a second state which indicates that the communication route from said source node to said relay node has been disconnected, and to relay said second control message to an information link composing a part of destination node side of said communication route.

3. A method of transmitting control information in a communication newwork having a plurality of nodes connected to one another through information links, comprising:
   a first step of operating a message source node to send out a first control message containing a destination node discriminator and a source node discriminator for establishing a communication route with a message destination node to one information link determined in accordance with said destination node discriminator;
   a second step of operating a relay node on said communication route having received said first control message to set route flag means prepared to correspond to the communication route defined by the source node discriminator and the destination node discriminator of said first control message, at a first state which indicates that the route from said source node to said relay node has been established, and to relay said first control message received by said relay node to an information link determined in accordance with said communication route;
   a third step of operating said relay node to change the state of said route flag means, when it receives from an information link at the side of said source node a second control message indicating the disconnection of said communication route, to a second state which indicates that the communication route from said source node to said relay node has been disconnected, and to relay said second control message to an information link determined by a destination node discriminator of said second control message; and
   a fourth step of operating said relay node to refer, when said relay node detects that the condition of the information link connected to said relay node has changed, to said route flag means corresponding to the communication route composed partially of said information link, in order to judge whether or not a third control message for informing an adjacent node of the change in condition of said communication route detected by the relay node is to be sent out by itself.

4. A control information transmitting method according to claim 3, wherein said relay node includes link flag means for indicating the state of each of a plurality of information links connected to said relay node, and wherein said relay node transmits each of said control messages in accordance with the state of the link flag means corresponding to the information link.

5. A control information transmitting method according to claim 3, wherein said relay node refers to the route flag means corresponding to the communication route containing said information link at its upstream side if during, said fourth step the information link changes from its connect state to its disconnect state, and transmits the third control message to indicate the disconnection of said route to the information link at the downstream side of said communication route if said route flag is in the first state.

6. A control information transmitting method according to claim 3, wherein said relay node refers to the route flag means corresponding to the communication route containing said information link at its upstream side if during, said fourth step it is determined that the information link has changed from its disconnect state to its connect state, and transmits said third control message for establishing said route to said information link if said route flag is in its first state.

7. A communication network including a plurality of nodes connected through information links for establishing a communication route between two communicating nodes which includes a relay node positioned in said communication route comprising:
   a plurality of interface means connected to different information links, respectively, for receiving messages from said information links, transmitting messages to said information links and detecting the connections of said information links;
   selection means connected to said interfaces for selecting the information link to transmit said messages in accordance with the destinations of the received messages;
   table means for storing route flags indicating whether or not the routes from the source node to the destination nodes of said messages have been established, for each communication route defined by said source nodes and said destination nodes; and
   control means coupled to both said plurality of interface means and said selection means, respectively, for rewriting said route flags corresponding said communication routes selectively, when one of said interface means receives the control message for establishing or disconnecting said communication route from an adjacent node, and for transmitting the control messages for notifying said adjacent node of the state changes of said information links in accordance with the state of the route flag corresponding to the communication route composed partially of one of said information links when any of said interface means detects the state changes of one of said information links.

* * * * *